(12) United States Patent  
Wilson et al.

(10) Patent No.: US 7,523,871 B1  
(45) Date of Patent: Apr. 28, 2009

(54) IDENTIFICATION THEFT PROOF TAG AND STICKER METHOD

(76) Inventors: Allen Wilson, 3906 Windrose Plz., Antelope, CA (US) 95843-5236; Terry Peterson, 161 Wykoff Dr., Vacaville, CA (US) 95688-3544

( * ) Notice: Subject to any disclaimer, the term of this patent is extended or adjusted under 35 U.S.C. 154(b) by 0 days.

(21) Appl. No.: 11/998,025

(22) Filed: Nov. 28, 2007

Related U.S. Application Data

(60) Provisional application No. 60/872,335, filed on Dec. 1, 2006.

(51) Int. Cl.  
*G06K 19/00* (2006.01)

(52) U.S. Cl. .................. 235/487; 235/488; 235/489; 235/492

(58) Field of Classification Search .......... 235/375, 235/380, 451, 487, 492  
See application file for complete search history.

(56) References Cited

U.S. PATENT DOCUMENTS

| | | | | |
|---|---|---|---|---|
| 4,597,814 A | * | 7/1986 | Colgate, Jr. ............... | 156/219 |
| 5,012,229 A | * | 4/1991 | Lennon et al. ............. | 345/1.1 |
| 5,036,610 A | * | 8/1991 | Fehr ........................... | 40/300 |
| 5,570,081 A | * | 10/1996 | Holstrom ................. | 340/573.3 |
| 5,912,956 A | * | 6/1999 | Longo et al. ............ | 379/144.07 |
| 6,064,307 A | * | 5/2000 | Silver ....................... | 340/573.1 |
| 6,741,178 B1 | * | 5/2004 | Tuttle ....................... | 340/572.1 |
| 2005/0151321 A1 | * | 7/2005 | Hennessy et al. ........... | 273/302 |
| 2006/0229979 A1 | * | 10/2006 | Sato et al. ..................... | 705/39 |

\* cited by examiner

*Primary Examiner*—Michael G Lee  
*Assistant Examiner*—Ali Sharifzada

(57) ABSTRACT

The steps of an identification theft proof tag and sticker method are providing a plurality of tags with a telephone number, a PIN, and a plurality of selections corresponding to a phone number, each tag optionally containing a smart chip and a smart card with a microprocessor; activating the tag by the user by following specific instructions and placing a registered tag on a valuable; following the instructions printed on the tag when finding a lost valuable by a person other than the owner; using the tag as a phone card, if needed, and dialing the number on the back of the tag; entering the PIN when prompted to do so, and selecting a contact number; and contacting the owner and ascertaining the best way to return the valuable.

2 Claims, 9 Drawing Sheets

If found, call 800-278-1894
PIN Code xxxxxx    www.smartitag.com

If found, call 800-278-1894 
PIN Code xxxxxx    www.smartitag.com

IDENTIFICATION THEFT PROOF TAG AND STICKER METHOD

RELATED APPLICATION

The present invention is based upon Provisional Application No. 60/872,335 filed Dec. 1, 2006, the subject matter of which is incorporated by reference herein

BACKGROUND OF THE INVENTION

1. Field of the Invention

The present invention relates to an identification theft proof tag and sticker method and more particularly pertains to easily contacting the owner of missing valuables when found by a stranger.

2. Description of the Prior Art

The use of identification tags is known in the prior art. More specifically, identification tags previously devised and utilized for the purpose of providing a method of the return of valuables are known to consist basically of familiar, expected, and obvious configurations and steps, notwithstanding the myriad of designs encompassed by the crowded prior art which has been developed for the fulfillment of countless objectives and requirements. By way of example, U.S. Pat. No. 5,912,956 issued Jun. 15, 1999, to Longo relates to a System and Method for Anonymously Establishing Telephonic Connections.

While the prior art methods fulfill their respective, particular objectives and requirements, they do not describe an identification theft proof tag and sticker method that allows for easily contacting the owner of missing valuables when found by a stranger while also preventing identity theft.

In this respect, the identification theft proof tag and sticker method according to the present invention substantially departs from the conventional concepts and designs of the prior art, and in doing so provides an apparatus primarily developed for the purpose of easily contacting the owner of missing valuables when found by a stranger while also preventing identify theft.

Therefore, what is needed is a method and system for a tag or sticker that prevents identity theft and also provides more than one contact number for any individual to use to contact the owner of lost belongings or pets and provides information for emergencies or other pertinent information on the tag. There are no tags that serve any of those functions on the market today.

The present invention provides a versatile tag and sticker that are visible, identification theft proof, and which also contain a calling card and smart chip capability that can contain personal information. The present invention places the finder of a belonging or pet directly in contact with an owner without revealing the owner's personal information, i.e. no phone number, no name, and no address are revealed. Pursuant to the present invention, no call is relayed. This is unlike competing products. There is no subscription to an answering service. Rather, the present invention offers service that is 24/7/365 and completely automated by an IVR system. The tag of the present invention also can serve as a calling card in case of emergencies or just to talk to another individual registered by the owner as a contact number. Our tag holders are serialized for tracking purposes and security. Each tag holder serial is married to the unique PIN/Code and has smart card technology incorporated in the tag for various purchases or to contain personal information. A smart card is a card that is optionally embedded with either a microprocessor and a memory chip or only a memory chip with non-programmable logic. The microprocessor card can add, delete, and otherwise manipulate information on the card, while a memory-chip card, i.e. pre-paid phone cards, can only undertake a pre-defined operation.

SUMMARY OF THE INVENTION

The present invention provides a versatile tag and sticker that are visible, identification theft proof, and which also contain a calling card capability and, optionally, a smart chip that can contain personal information. The present invention has a tag or sticker you attach to belongings. The back of the tag or front of the sticker, has a telephone number, which is preferably but not necessarily an 800 number, and unique PIN/Code imprinted on each and, as an option, selection #1 home, #2 work, #3 cell, #4 family, #5 other. After a user purchases the tag, the user registers the pin/code on the tag, up to 5 contact phone numbers, and a security password. When an individual finds valuables or pets with a tag or sticker attached, they call the phone number on the tag, enter the PIN/Code. At that time the system verifies the validity of the PIN and automatically calls all of the preselected numbers which the purchaser provided. They are then placed directly in contact with the owner of the lost belonging. No personal phone number, name, address or other personal information is revealed to the finder. The tags come with preselected minutes of calling time. A smart chip optionally resides on a tag for medical or emergency information.

DETAILED DESCRIPTION OF THE INVENTION

Figure 1:
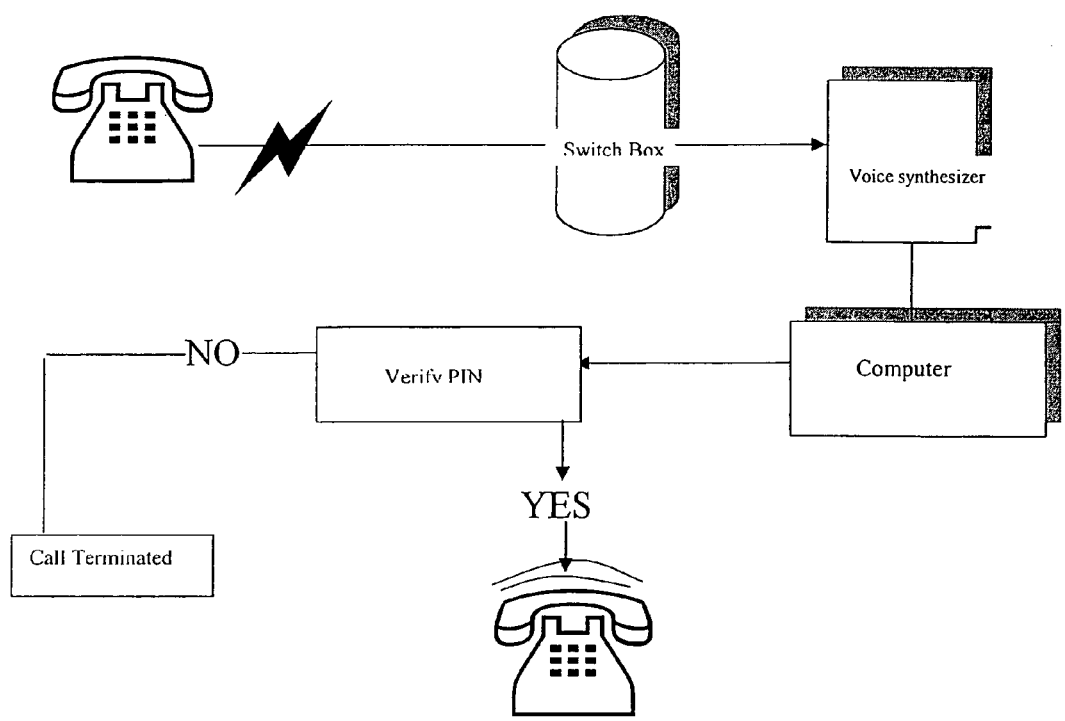
FIG. 1 is a schematic illustration of the apparatus adapted for use in performing the identification theft proof tag and sticker method.
Figure 2:
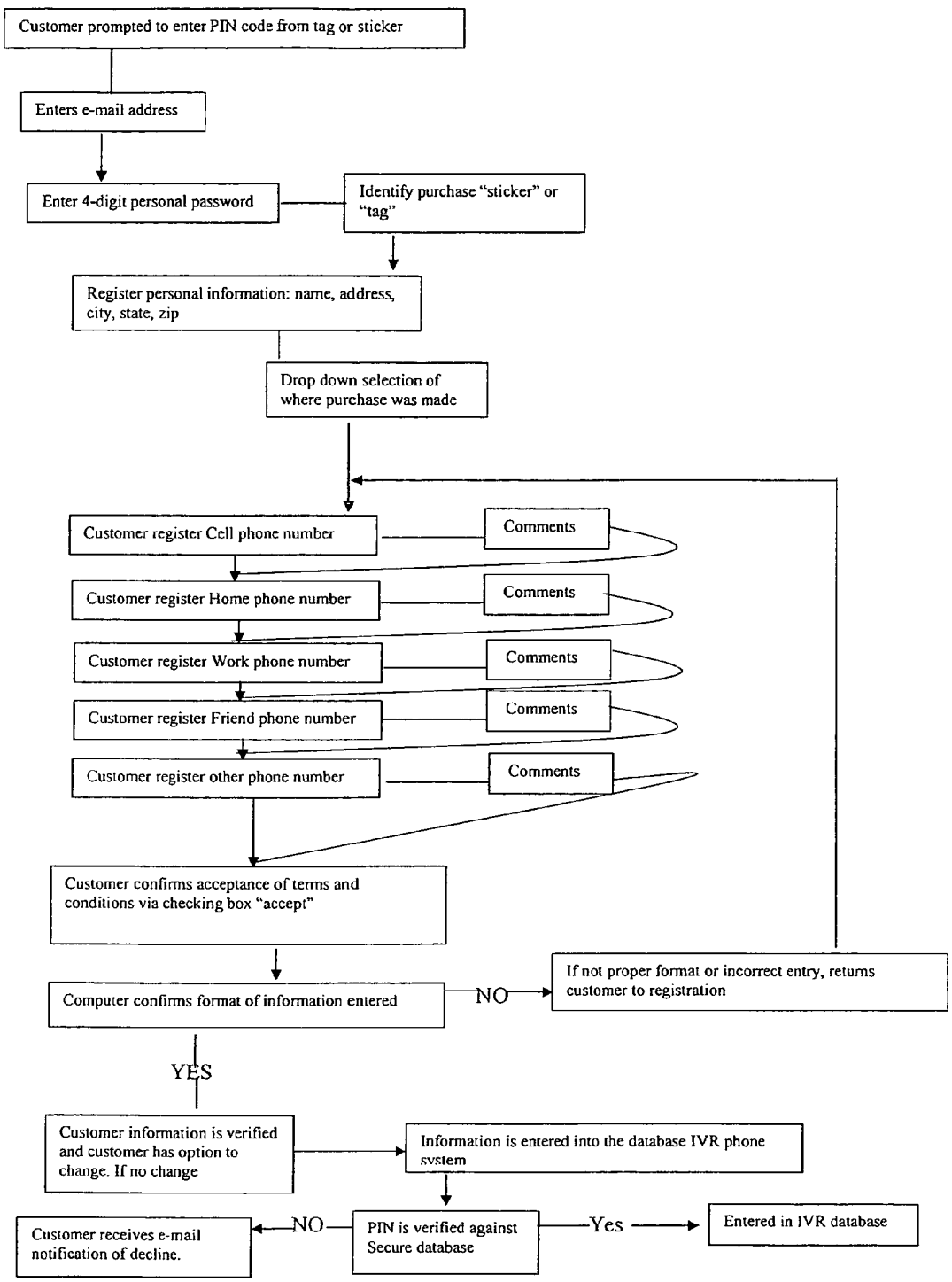
FIG. 2 is a flow diagram of the web registration on an SSL secure site.
Figure 3:
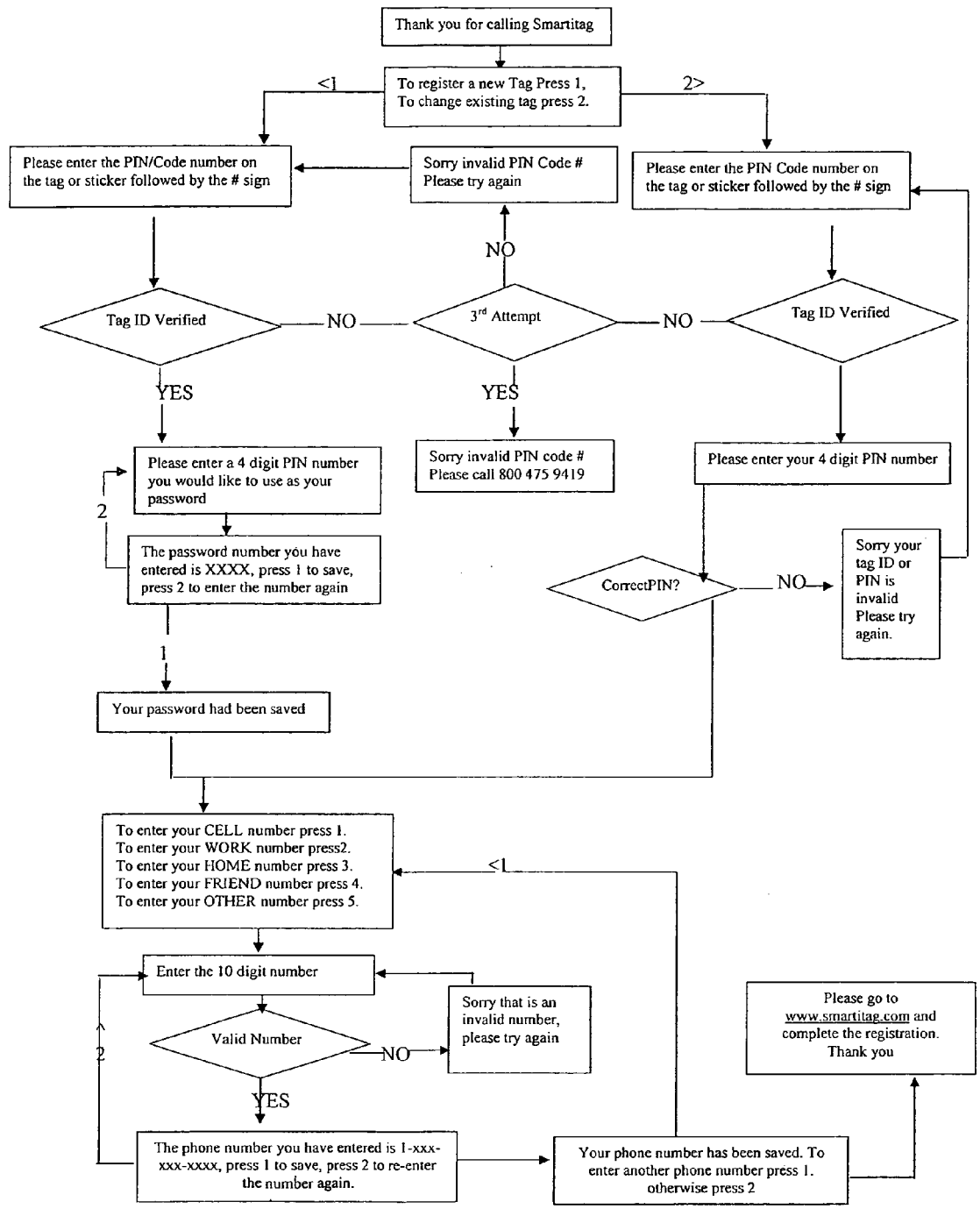
FIG. 3 is a flow diagram of a tag and sticker registration.
Figure 4:
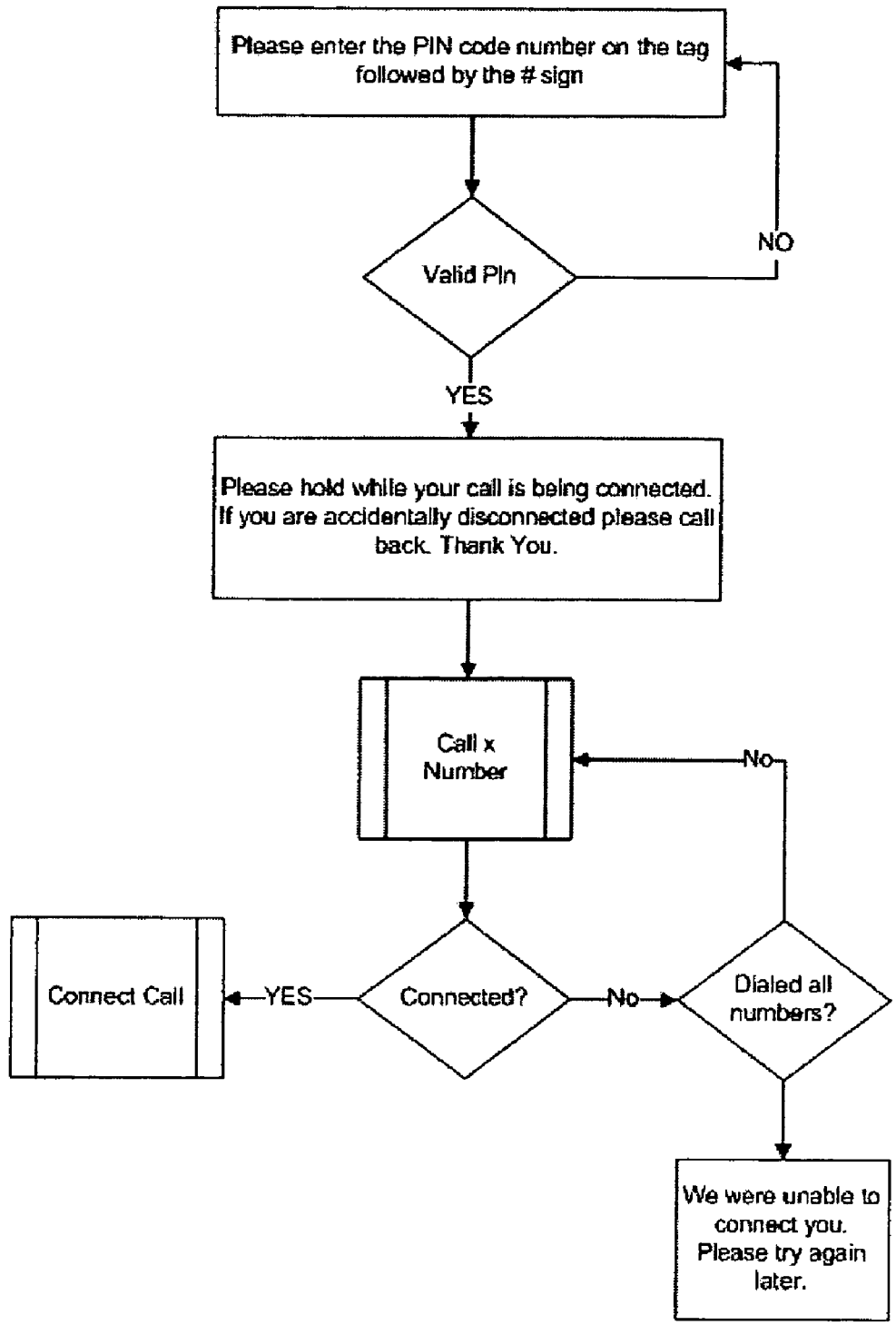
FIG. 4 is a "found tag" call flow.
Figure 5:
FIGS. 5-15 are various embodiments of the Smart-i-Tags.
Figure 6:
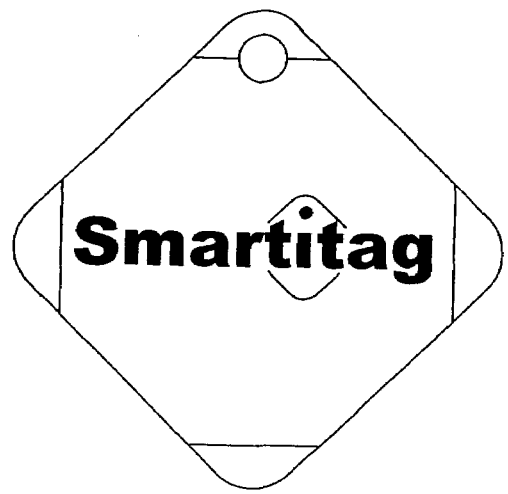
Figures 7, 8:
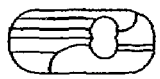
Figure 9:
Figure 10:
Figure 11:
Figure 12:
Figure 13:
Figure 14:
Figure 15:

The present invention is a device made up of a plurality of components. Hangtags are 30 ml PVC.

With respect to the stickers, art is received, pre-flighted and a proof is made. After proof approval is received, job is placed into production. Printing is done standard lithograph on a teslin sheet several up. After printing is completed, variable data and PINS are lasered on the sheets. After lasering, both sides of sheet are cold glue laminated with a clear PVC sheet. After lamination, sheet is die cut to individual pieces and internal die cuts such as hanger holes and a perforation to punch out individual tags is done. If no PINS are imaged, a writable matte lamination is used on the back. Individual pieces are shrink-wrapped into batches, labeled and boxed. PVC or other material can be substituted for Teslin. Printed sheets can be laminated after printing with cold glue or a hot glue and/or a hydraulic lamination process and die cut and numbered afterward in individual pieces by an inkjet, thermal imaging or some other process.

Sticker: 1. Art is received, pre-flighted and a proof is made. 2. After proof approval is received, job is placed into production. 3. Printing is done standard lithograph or flexo or some other printing process sheet fed or web on an adhesive mylar, pvc, paper or similar stock in rolls or sheets several up. 4. Sheets or rolls are trimmed and die cut to specific sizes within a sheet. 5. After printing is completed, variable data and PINS are lasered or ink jetted on the labels. 6. After lasering, top of sheet or rolls can be cold glue laminated with a clear PVC sheet or a clear UV coating. 7. Individual pieces are shrink-wrapped into batches, labeled and boxed.

All tag, stickers, smart tags are sent out dummied down. This means they are useless unless activate by the company and the consumer.

The smart chip is comprised of IC memory cards that can hold up to 1-4 KB of data, but have no processor on the card with which to manipulate that data. Thus, they are dependent on the card reader, also known as the card-accepting device, for their processing and are suitable for uses where the card performs a fixed operation. Microprocessor cards, also generally referred to by the industry as "chip cards", offer greater memory storage and security of data than a traditional mag stripe card. Chip cards also can process data on the card. The current generation of chip cards has an eight-bit processor, 16 KB read-only memory, and 512 bytes of random-access memory. These cards are used for a variety applications, especially those that have cryptography built in, which requires manipulation of large numbers. Thus, chip cards have been the main platform for cards that hold a secure digital identity. Some examples of these cards are: cards that hold money, "stored value cards"; cards that hold money equivalents, "affinity cards"; cards that provide secure access to a network; cards that secure cellular phones from fraud. The card of the present invention is a Smart-i-Tag smart card embedded with either a microprocessor and a memory chip or only a memory chip with non-programmable logic. The micro-processor card can add, delete, and otherwise manipulate information on the card, while a memory-chip card, for example, pre-paid phone cards, can only undertake a pre-defined operation.

The tags or stickers have a unique PIN/CODE imprinted on them. The smart chip is imbedded into the tag. The tags have a hole at the top the customer inserts a device to attach the tag to their belonging or pet's collar. The sticker has an adhesive substance that when applied to an item will adhere to that item. To activate a tag or sticker, the retailer, agent or distributor notifies the corporate office of receipt of the tags. When placed in the hands of the consumer, the consumer registers the tag and sticker for activation.

Following are the steps for the consumer to activate the tags. They can either call the phone number on the back of the hangtags to register or register online through an automated or semi-automated system that allows the user to submit the required information over the Internet through the use of online forms. To register they must provide the PIN/Code on the tags: enter a personal password, register up to five contact phone numbers. Tags are now activated. If they choose they can also register personal information on the smart chip located on specific tags. After registration they will attach the tags either by a device provided that is inserted into the top of the tag or will stick the tag to their belonging.

EMBODIMENT 1

In one particular embodiment of the present invention the device is made up of the following components: the hangtags are 30 ml PVC. The tags are 1"×1", printed with a graphic of our trademarked "Smart-i-Tag" logo on the front in the current registered colors, the background of the tag is yellow with a sunburst effect. The corners of the tags are blue. There is a hole at the top of the tag that is ⅛" in circumference. On the tag is a "pet Locator" tag. The top of the tag will be printed "pet" and the bottom of the tag "locator" below is "smarti-tag.com". The pet locator tag is packaged on a hang tag with three 1"×1" tag that can be detached from the holder. There is printing on the back of the tag as follows: "if found: dial 1-800-278-1894", "PIN/Code #######" which is a unique set of numbers that are random to each set of tags or stickers.

It should be understood that the sizes and thicknesses of the various tags and stickers are illustrative only since wide ranges of sizes and thicknesses are adapted to be utilized for the various embodiments.

The following steps are used in manufacturing of the tag: 1. Art is received, pre-flighted and a proof is made. 2. After proof approval is received, job is placed into production. 3. Printing is done standard lithograph on a Teslin sheet several up. 4. After printing is completed, variable data and PINS are lasered on the sheets. 5. After lasering, both sides of sheet are cold glue laminated with a clear PVC sheet. 6. After lamination, sheet is die cut to individual pieces and internal die cuts such as hanger holes and a perforation to punch out individual tags is done. 7. If no PINS are imaged, a writable matte lamination is used on the back. 8. Individual pieces are shrink-wrapped into batches, labeled and boxed. 9. PVC or other material can be substituted for Teslin. 10. Printed sheets can be laminated after printing with cold glue or a hot glue and/or a hydraulic lamination process and die cut and numbered afterward in individual pieces by an inkjet, thermal imaging or some other process.

The following steps are used in manufacturing the Sticker: 1. Art is received, pre-flighted and a proof is made. 2. After proof approval is received, job is placed into production. 3. Printing is done standard lithograph or flexo or some other printing process sheet fed or web on an adhesive mylar, pvc, paper or similar stock in rolls or sheets several up. 4. Sheets or rolls are trimmed and die cut to specific sizes within a sheet. 5. After printing is completed, variable data and PINS are lasered or ink jetted on the labels. 6. After lasering, top of sheet or rolls can be cold glue laminated with a clear PVC sheet or a clear UV coating. 7. Individual pieces are shrink-wrapped into batches, labeled and boxed.

Each tag holder is serialized with a unique code that is related to the PIN/Code on the tags themselves. All tags are sent dummied for security purposes. And have to be activated by the parent company, then the consumer.

The smart chip is comprised of IC memory cards can hold up to 1-4 KB of data, chip cards has an eight-bit processor, 16 KB read-only memory, and 512 bytes of random-access memory. Cryptography is built in, which requires manipulation of large numbers. Chip cards hold a secure digital identity. Cards hold money equivalents, secure access to a network, secure phones from fraud, secure from piracy. A smart card is embedded with either a microprocessor and a memory chip or only a memory chip with non-programmable logic. The microprocessor card can add, delete, and otherwise manipulate information on the card, while a memory-chip card can only undertake a pre-defined operation.

EMBODIMENT 2

In another embodiment of the present invention the device made up of the following components: the hangtags are 30 ml PVC.

The following steps are used to manufacture the stickers of this embodiment: 1. Art is received, pre-flighted and a proof is made. 2. After proof approval is received, job is placed into production. 3. Printing is done standard lithograph on a Teslin sheet several up. 4. After printing is completed, variable data and PINS are lasered on the sheets. 5. After lasering, both sides of sheet are cold glue laminated with a clear PVC sheet.

6. After lamination, sheet is die cut to individual pieces and internal die cuts such as hanger holes and a perforation to punch out individual tags is done. 7. If no PINS are imaged, a writable matte lamination is used on the back. 8. Individual pieces are shrink-wrapped into batches, labeled and boxed. 9. PVC or other material can be substituted for Teslin. 10. Printed sheets can be laminated after printing with cold glue or a hot glue and/or a hydraulic lamination process and die cut and numbered afterward in individual pieces by an inkjet, thermal imaging or some other process.

The following steps are used to manufacture the sticker of this alternate embodiment. 1. Art is received, pre-flighted and a proof is made. 2. After proof approval is received, job is placed into production. 3. Printing is done standard lithograph or flexo or some other printing process sheet fed or web on an adhesive mylar, pvc, paper or similar stock in rolls or sheets several up. 4. Sheets or rolls are trimmed and die cut to specific sizes within a sheet. 5. After printing is completed, variable data and PINS are lasered or ink jetted on the labels. 6. After lasering, top of sheet or rolls can be cold glue laminated with a clear PVC sheet or a clear UV coating. 7. Individual pieces are shrink-wrapped into batches, labeled and boxed.

Each tag holder is serialized with a unique code that is related to the PIN/Code on the tags themselves. All tags are sent dummied for security purposes and have to be activated by the parent company, then the consumer.

The smart chip is comprised of IC memory cards and can hold up to 1-4 KB of data. Chip cards have an eight-bit processor, 16 KB read-only memory, and 512 bytes of random-access memory. Cryptography is built in, which requires manipulation of large numbers. Chip cards hold a secure digital identity. Cards hold money equivalents, secure access to a network, secure phones from fraud, secure from piracy. A smart card is embedded with either a microprocessor and a memory chip or only a memory chip with non-programmable logic. The microprocessor card can add, delete, and otherwise manipulate information on the card, while a memory-chip card can only undertake a pre-defined operation.

EMBODIMENT 3

In one particular embodiment of the present invention, before the consumer can activate the tags the distributor, agent, retailer or parent company needs to activate the tag from the dummied stage. The first step is to call the corporate office and request for activation of tag. This is accomplished by calling the IVR processor, notifying them of receipt of tags, registering the serial number on the tag holder and the PIN/Code on the tags. The purpose of this step is to maintain integrity of the tag and maintain a secure method of distribution. After the consumer purchases the tags or stickers they follow the instructions on the hang holders. They are given two options: (1) call our automated IVR phone system; or (2) go to a particular website, for example www.smartitag.com, to register their Smart-i-Tag.

With respect to the first option, the consumer would call our automatic IVR phone system. They are then prompted to enter the unique PIN/Code on the back of the tags or front of the sticker. They are then prompted to provide a unique "password" that you generate yourself. They are then prompted to enter 5 contact phone numbers, which may be their home, work, cell, family or relative, and in the case of pets you might want to add your veterinarians phone number or another type of emergency number.

With respect to registering via website, the consumer would go to a particular website and click on "activate" or "register tag" or the functional equivalent, whether a button or a link. They will then be prompted to enter the following information. This is a 5-step process. STEP 1: ACTIVATE YOUR TAGS OR LABELS To begin the registration process online, please enter your unique digit PIN number printed on your Smart-i-Tag in the space below. Activation is necessary to link you and the items you tag or label. If you have already registered and activated tags in the past you do not need to activate again. Click here to go to your Member Login. You will activate your tag by entering the unique PIN/Code imprinted on the back or the tags or the front of the sticker. 2. You will be prompted to step #2 enter your e-mail address, for added security if you change any of your phone contact number via our IVR system, your 4-digit phone password, and finally another password. 3. You will be prompted to step #3 here you will find a pull down, where you will indicate where you purchased your Smart-i-Tag. You will see another pull down that will ask "type of organization" you belong to or would like us to donate a portion of the sale to. You will then be prompted to enter in certain "required fields" and optional field. The following are required: first name, last name. These are optional: address, city, state, zip. You will now be prompted to click on "submit" which will take you to step. 3. At this stage you will enter the 5 contact numbers and comments relating to those numbers. Here are the prompts: "home phone"-"comments", comments may be home in mountains, by the lake etc.; "work phone"-"comments", comments may be dads work, moms work, sister's work; "Cell Phone"-"comments" comments may be, dads cell, mom's cell, sister cell; "Relative/friend"-"comment" comments may be, grandmother phone, grandpa phone, uncle, aunt; "Other phone"-"comments" comments may be, doctor phone, veterinarian phone, school phone, police, fire, or any other number you wish to include. When completed you will click "submit" at this juncture.

In the case of an emergency we recommend basic pet information. Additionally if you have a regular veterinarian, it may be helpful to have their contact information as well. Do you intend to use Smart-i-Tag for your pets? Are you registering a "Pet Locator" tag, if the answer is "yes", you will be led to another page, this page will inquire about your pet. "Pet Name" "type" sex", "breed or description" "pet date of birth" Month year. You can enter up to three pets and also include "medical conditions". If you have a veterinarian you will then be prompted to enter "clinic/veterinarian name" "phone" "address" "State" "city" "zip" after you have completed the pet section click "submit". If you do not have pets, you will click on "submit". Both take you to the same page which contains our disclaimer. Remember Smart-i-Tag provides the best assistance possible in helping you find your lost belonging but we do not claim, warrant or guarantee that lost items will be located or returned. Smart-i-Tag has no control over events taking place in your state, city or neighborhood and accepts no liability for any injury, damage, claim or events related to any items lost when using the Smart-i-Tag System. By checking the "Accept" button, you understand and agree to these terms and conditions. At this time you have the option of "accept" or "decline". CONGRATULATIONS! You have now completed the activation of your Smart-i-Tags. Please go to Login and make sure all your information is correct or add any other information you feel necessary. Remember, Smart-i-Tag provides the best possible assistance in helping you find and locate your lost belonging. Statistics prove that 70 to 80% of belongings lost would be returned if you make it easy for the person to contact you when they find you belongings.

EMBODIMENT 4

In another embodiment of the present invention, before the consumer can activate the tags the distributor, agent, retailer or parent company needs to activate the tag from the dummied stage. The first step is to call the corporate office and request for activation of tag. This is accomplished by calling the IVR processor, notifying them of receipt of tags, registering the serial number on the tag holder and the PIN/Code on the tags. To use our Smart-i-Tag: 1. You register them; 2. You place them on your valuables; 3. When someone finds your lost valuable they will follow the instructions printed on the Smart-i-Tag. 4. You will be placed in direct contact with that individual, and ascertain with that individual the best way to get your valuables returned. If you need to use as a phone card, you follow the instructions on the tag, which are: 1. Dial the number on the tag. 2. Enter the PIN/Code. 3. Press the number on the tag or prompted by the IVR system that corresponds to the individual you want to be place in contact with. The call will go directly to them. Smart chip is loaded by the consumer's computer with information.

The present invention is unique in the "tag" industry. The invention does not reveal personal information to a finder of lost belonging. The finder is provided various ways to contact the owner. Smart-i-Tags are safe, secure, private, no personal information revealed. The Smart-i-Tag system is 100% automated. Finder is placed in direct contact with owner immediately. Unlike most tags, the tag of the present invention provides five contact numbers to get your belongings returned. The tag has predetermined minutes of calling time built into the tag, that can be "filled" with additional minutes. No other tags on the market have such a feature. We incorporate a smart chip in the tag that contains information the customer may want to convey for medical, veterinarian or emergency information. The tag is the same thickness as credit card and durable. All tags are distributed dummied down for security purposes. Each holder is serialized for inventory and distribution and GS1 coded.

The following steps are used in the first embodiment of the identification theft proof tag and sticker method of the present invention.

The first step is providing a plurality of tags with a telephone number, a PIN, and a plurality of selections corresponding to a phone number. Each tag contains a smart chip, a cryptograph, and a smart card with a microprocessor.

The next step is the user activating the tag by following specific instructions and placing a registered tag on a valuable.

The next step is following the instructions printed on the tag when finding a lost valuable by a person other than the owner.

The next step is using the tag as a phone card, if needed, and dialing the number on the back of the tag.

The next step is entering the PIN when prompted to do so.

The final step of the method is contacting the owner and ascertaining the best way to return the valuable.

In an alternate adaptation of the first embodiment an additional step of labeling the tags as pet tags if used on pets is added.

In a further adaptation of the first embodiment of the present invention, the step of manufacturing the tags is added. The manufacturing step is first submitting the tag art, printing variable data and PINs on sheets, laminating the sheets, die cutting the sheets, numbering each tag, shrink-wrapping the tags into batches, labeling them, and putting them in boxes is included.

The following steps are used in the second embodiment of the identification theft proof tag and sticker method used for easily contacting the owner of missing valuables when found by a stranger.

The first step of the second embodiment is providing a plurality of tags made out of the class of materials included but not limited to 30 mL PVC. The tags are one inch by one inch squares with a top, front, and back. The front is printed with a graphic of the production trademarked logo. The top has an aperture with approximately a ⅛ inch circumference. The back contains a telephone number which is preferably, but not necessarily, an 800 number; a personal identification number, hereinafter referred to as PIN, which is a unique set of numbers that are random for each set of tags; and five selections corresponding to a phone number that was previously registered by the owner of the tag. If the tag is for a pet, the front of the tag is labeled so that users know to use those tags for their pets.

The next step is manufacturing the tags using the scheme that follows.

One step of manufacturing is submitting the tag art and allowing it to be pre-flighted and a proof to be made.

Another step of manufacturing is printing variable data and PINs using standard lithography and laser printing on sheets made out of a material selected from the class of materials including but not limited to PVC and Teslin. Teslin is a registered trademark of PPG Industries, Inc. of Pittsburgh, Pa. and relates to micro porous sheets, films, and membranes sold in roll form for general industrial use.

Another step of manufacturing is laminating via processes selected from the class of processes including cold glue, hot glue, and hydraulic lamination with a clear PVC sheet.

Another step is die cutting the sheets into individual pieces and adding internal die cuts such as hanger holes and perforations to punch out individual tags.

Another step of manufacturing is numbering the individual tags with an inkjet.

Another step is shrink-wrapping individual pieces into batches, labeling them, and putting them in boxes.

If the tag is a pet locator tag, another step of manufacturing is packing it on a hang tag with three one inch by one inch tags that can be detached from the holder.

Each individual tag has the option of containing a smart chip able to hold a secure digital identity comprised of IC memory cards that can hold up to four kilobytes of data, an eight-bit processor, 16 kilobytes of read-only memory, and 512 bytes of random access memory.

A cryptograph is also incorporated for security purposes which require the manipulation of large numbers.

Another step is embedding a smart card with either a microprocessor card that can add, delete, and otherwise manipulate information on the card or a memory-chip card can only undertake a pre-defined operation.

Another additional alternate step in manufacturing is applying an adhesive to the tags for allowing the tags to be used as stickers with similar characteristics as the tags.

The next step is the user activating the tag from the dummied stage in order to link the user and the items they tag.

Activating the tag, if using a phone activation procedure, is accomplished by calling the corporate office and requesting an activation of tag to the interactive voice response processor, hereinafter referred to as IVR;

The next step in phone activation is notifying IVR of the receipt of the tags, registering the serial number located on the tag holder, and entering the PIN located on the tags.

The next step in phone activation is providing a unique password generated by the user and entering five contact phone numbers where they can easily be reached, for example, home, cell, work, family, and other;

Activating the tag, if using a web activation procedure, is accomplished by going to a particular web site to activate the tags and clicking on a link that initiates the registration process.

The next step is entering in the spaces provided the unique digital PIN number printed on the back of the tag, the user's e-mail address, for added security if any changes to the phone contact numbers were made, a unique four-digit phone password generated by the user is required.

The next step is indicating where the tags were purchased and the name of an organization to which a portion of the tags sale will be donated.

The next step is filling out the required fields indicated by the web site, filling in the contact numbers the user wishes to use with the tags, and any comments relating to the contact numbers in the spaces provided.

If the tag is for a pet, the user will be redirected to another web page where they must fill out additional information regarding the pet and its veterinarian.

If the tag is not for a pet, the user will skip the pet registration process and proceed to the final step of activation.

The final step of activation is reading the disclaimer and agreeing to the terms and conditions provided to finish the tag activation procedure.

The next step is placing the registered tag on a valuable.

When a lost valuable is found by a person other than the owner, the next step is following the instructions printed on the tag.

The instructions place the person finding the valuable in direct contact with the owner of the lost valuable and ascertaining the best way to return the valuable to the owner.

If needed, the tag is used as a phone card to contact the owner of the lost valuable.

The next step is dialing the number on the back of the tag.

The final step is entering the PIN located on the back of the tag when prompted to do so, and pressing the number on the tag that corresponds to the individual that the finder of the valuable wishes to be placed in contact with.

While the present invention has been described above in terms of specific embodiments, it is to be understood that the invention is not limited to these disclosed embodiments. Many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the application as a whole, as understood by those of skill in the art relying upon the disclosure in this specification and the attached drawings.

What is claimed is:

1. An identification theft proof tag and sticker method used for easily contacting an owner of missing valuables when found by a stranger comprising, in combination:

providing a plurality of tags, each tag having a tag holder with a serial number, the tags are one inch by one inch squares with a top, front, and back, the front is printed with a graphic of a production trademarked logo, the top has an aperture with approximately a ⅛ inch circumference, the back contains a telephone number, a personal identification number (PIN), which is a unique set of numbers that are random for each set of tags, corresponding to a phone number that was previously registered by the owner of the tag;

manufacturing the tags using the following scheme;

submitting the tag graphic and allowing the graphic to be pre-flighted and a proof to be made;

printing variable data and PINs using standard lithography and laser printing on sheets made out of a material selected from the class of materials including PVC and Teslin;

laminating via processes selected from the class of processes including cold glue, hot glue, and hydraulic lamination with a clear PVS sheet;

die cutting the sheets into individual pieces and adding internal die cuts;

numbering the individual tags with an inkjet;

shrink-wrapping the individual pieces into batches, labeling the batches, and putting the batches in boxes;

containing within each individual tag a smart chip which holds a secure digital identity comprised of IC memory cards that holds up to four kilobytes of data, and eight-bit processor, 16 kilobytes of read-only memory, and 512 bytes of random access memory;

incorporating a cryptograph for security purposes which requires the manipulation of large numbers;

embedding a smart card with either a microprocessor card adapted to add, delete, ad otherwise manipulate information on the card or a memory-chip card adapted to only undertake a pre-defined operation;

activating the tag by a user in order to link the user and items tagged;

notifying an interactive voice response (IVR) of the receipt of the tags, registering the serial number located on each tag holder, and entering the PIN located on each tag;

providing a unique password generated by the user and entering five contact phone numbers;

entering on a web site the unique PIN number printed on the back of the tag, the user's e-mail address for added security, a four-digit phone password, and the unique password generated by the user;

indicating where the tags were purchased and a name of an organization to which a portion of the tags' sale will be donated are for donation;

filling out required fields indicated by the web site, entering the five contact phone numbers the user associates with the tags, and any comments relating to the contact phone numbers in the spaces provided;

reading a disclaimer and agreeing to terms and conditions provided to finish the tag activation procedure;

placing a registered tag on a valuable;

following instructions printed on the tag when finding a lost valuable by a person other than the owner;

dialing the number located on the back of the tag; and
entering the PIN located on the back of the tag when prompted to do so;
being placed in direct contact with the owner of the lost valuable to determine the preferred way to return the valuable to the owner.

2. The method as set forth in claim 1 and further including the step of applying an adhesive to the tags for allowing the tags to be used as stickers.

* * * * *